United States Patent [19]

Clark

[11] Patent Number: 4,874,182
[45] Date of Patent: Oct. 17, 1989

[54] STROLLER APPARATUS FOR JUVENILE CAR SEAT

[75] Inventor: Gary E. Clark, Sikeston, Mo.

[73] Assignees: Wade Parker, Sikeston, Mo.; Richard G. Heywood, St. Louis, Mo.

[21] Appl. No.: 138,198

[22] Filed: Dec. 28, 1987

[51] Int. Cl.$^4$ .............................................. B62B 1/04
[52] U.S. Cl. .................................... 280/30; 280/643; 280/47.38; 297/130
[58] Field of Search .................. 280/30, 37, 647, 648, 280/650, 47.37 R, 47.38, 643; 297/130

[56] References Cited

U.S. PATENT DOCUMENTS

| | | | |
|---|---|---|---|
| 2,435,733 | 2/1948 | Belyeu | 155/41 |
| 2,481,382 | 9/1949 | Bennett | 155/79 |
| 2,604,333 | 7/1952 | Elmer | 280/37 |
| 2,720,911 | 10/1955 | Lantz | 155/41 |
| 2,803,468 | 8/1957 | Thompson | 280/30 |
| 3,041,081 | 6/1962 | Lott | 280/30 |
| 3,290,050 | 12/1966 | Ezquerra | 280/30 |
| 3,829,113 | 8/1974 | Epelbaum | 280/30 |
| 3,944,241 | 3/1976 | Epelbaum | 280/30 |
| 4,385,769 | 5/1983 | Molino | 280/30 X |

FOREIGN PATENT DOCUMENTS

| | | | |
|---|---|---|---|
| 1112005 | 3/1956 | France | 280/30 |
| 421113 | 5/1947 | Italy | 280/37 |
| 481306 | 5/1953 | Italy | 280/37 |

Primary Examiner—Kenneth R. Rice
Assistant Examiner—Michael Mar
Attorney, Agent, or Firm—Richard G. Heywood

[57] ABSTRACT

Stroller apparatus for converting a child's car seat having a supporting base into a mobile stroller unit in which the stroller apparatus includes a base frame, front and rear wheel sets mounted on the base frame for movement between an extended stroller position and a retracted car seat position within the base frame, an actuating lever for selectively operating the wheel sets between the extended and retracted positions, a latching mechanism for releasably interlocking the car seat supporting base to the stroller apparatus, and an extensible handle movable between an extended stroller position and a car seat position.

18 Claims, 6 Drawing Sheets

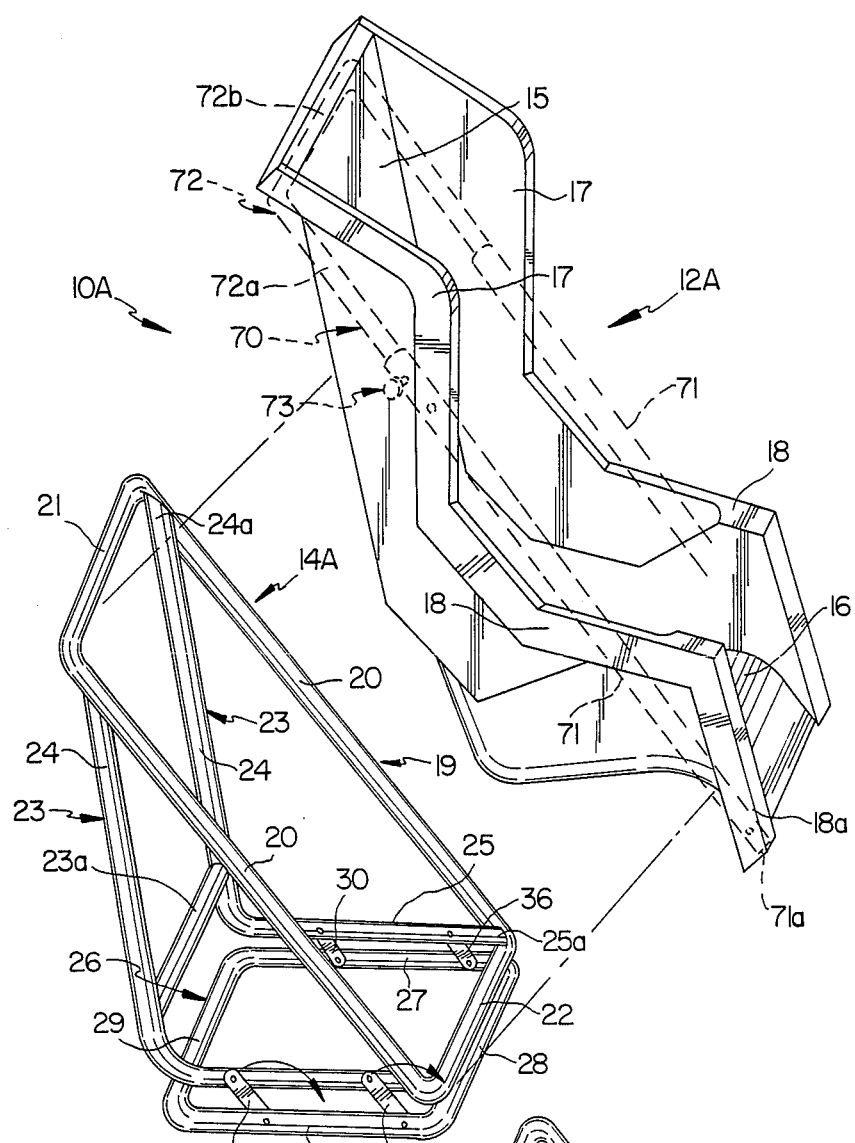
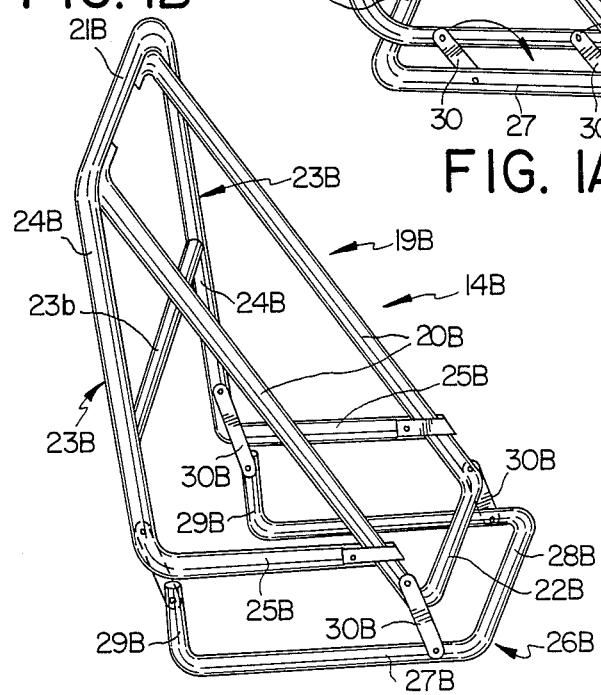
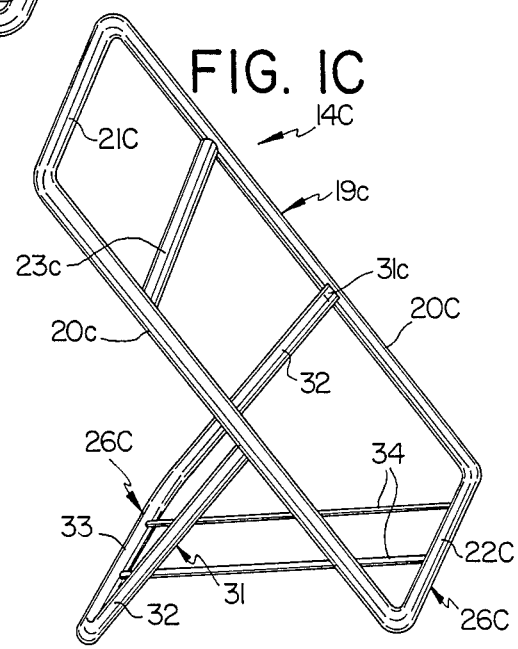
FIG. 1A
FIG. 1B
FIG. 1C

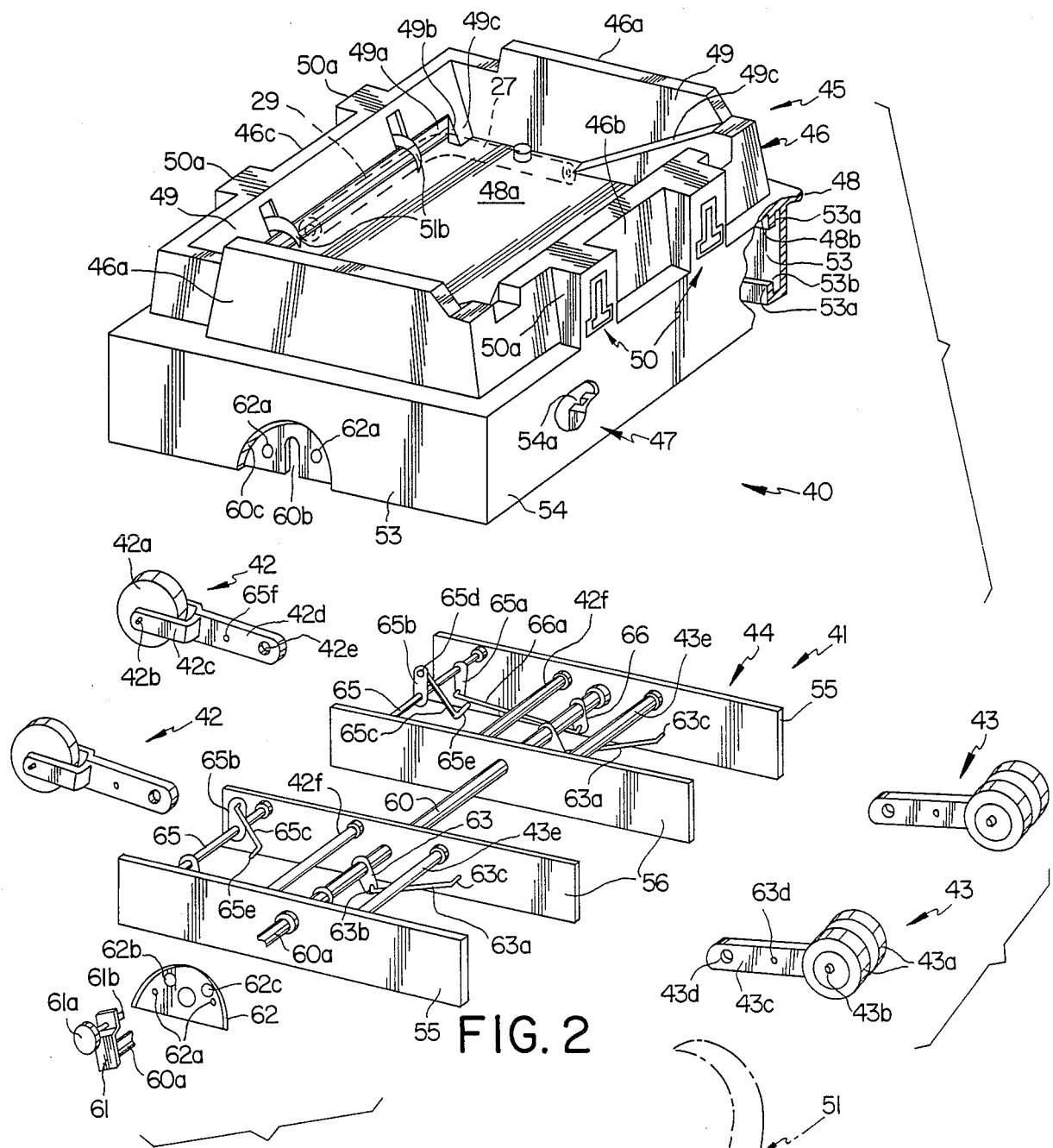
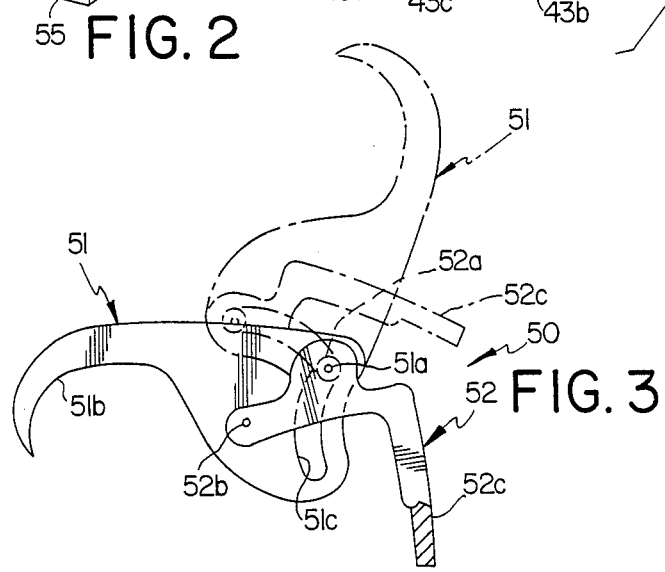

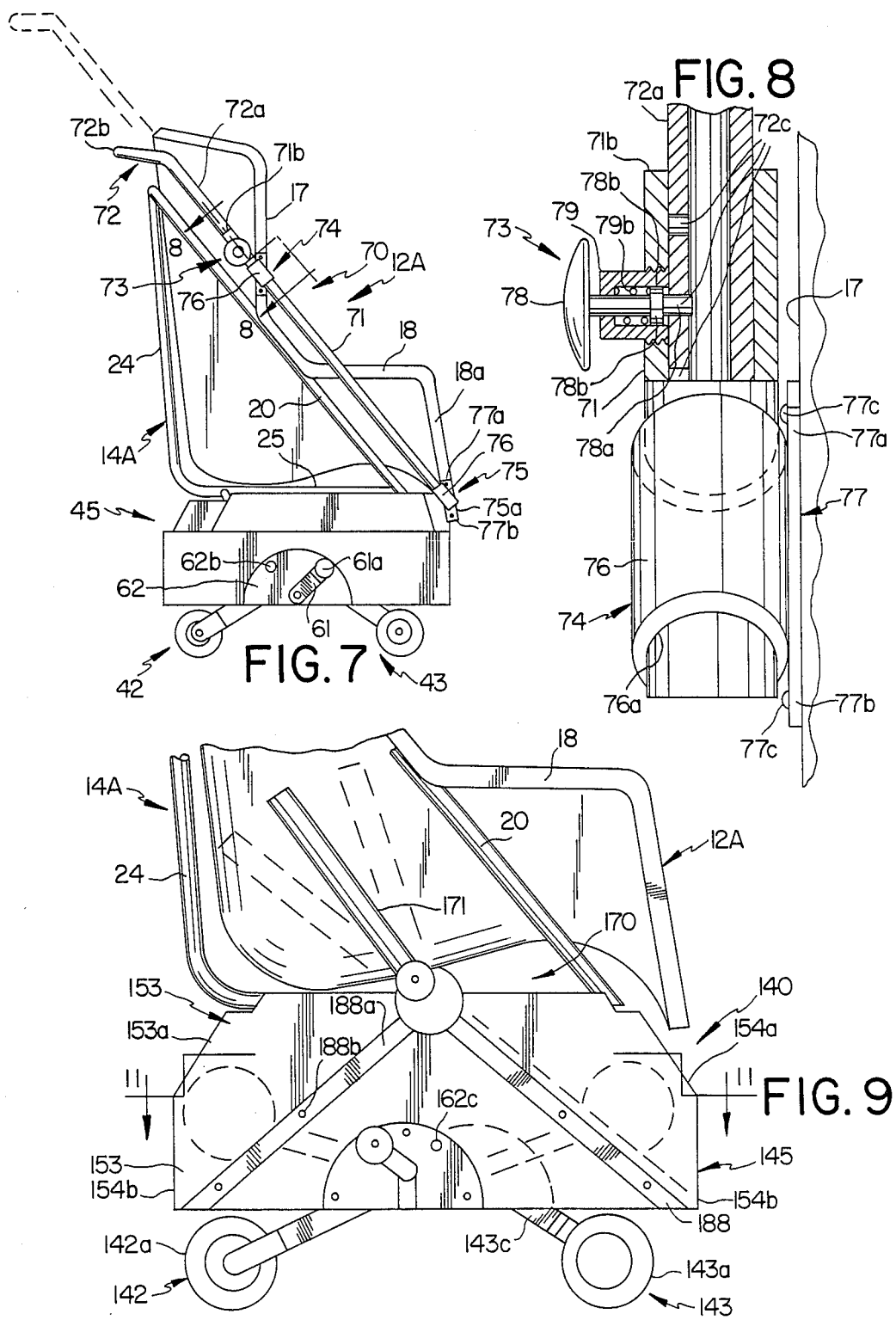

STROLLER APPARATUS FOR JUVENILE CAR SEAT

This invention relates generally to the juvenile furniture art, and more specifically to stroller apparatus for use with a child's car seat.

BACKGROUND OF THE INVENTION

For many years there has been an increasing awareness of the need for safe and comfortable juvenile furniture. With government safety laws establishing mandatory seat belt and juvenile car seat regulations, a wide variety of children's car seats have been designed to comfortably restrain and protect infants and small children during transportatin in various vehicles. There has also been a substantial increase in the types or varieties of stroller units available for transporting babies and small children from place to place without physically carrying them, as when parents are shopping or the like.

In low budget families, especially in the case of two working parents with separate cars, the ready accessibility and convenience of having two car seats and two separate stroller units can be expensive. It is recognized that there is a duplication of expense in that the structure of both conventional car seats and stroller units have a seating structure and restraining mechanism for holding the child. In addition, there is always the inconvenience of removing the child from the car seat and retrieving the stroller unit from the auto trunk and setting it up (and vice versa) at each place the parent goes during a shopping trip and on other occasions. Such procedure can become awkward or frustrating to a parent on a multiple stop trip.

SUMMARY OF THE INVENTION

The present invention is embodied in a stroller apparatus for converting a conventional juvenile car seat into a mobile stroller unit, and comprises a base frame for releasably interlocking with a car seat frame, retractable wheel sets on the base frame for movement between an extended stroller position and a retracted car seat position, lever means for operating the wheel sets, and handle means extensible between an extended operative stroller position and an inoperative car seat position.

A primary object of the present invention is to provide stroller apparatus that is releasably attachable to a juvenile car seat and usable therewith in either a car seat mode or a stroller mode.

Another object is to provide a stroller apparatus adapted to adjustably accommodate a variety of different car seat configurations now on the market.

Another object is to provide a stroller device for converting a child's car seat into a mobile stroller unit, and having wheel sets retractable into a base frame for using the combination car seat and stroller device as a juvenile car seat.

Still another object is to provide a stroller attachment to a child's car seat and having adjustable handle means.

Yet another object is to provide a stroller apparatus for releasable attachment to a child's car seat and adapted for use in a stroller mode or a car seat mode, and which is simple in construction, strong and durable, relatively inexpensive and which will conform to government safety standards.

These and still other objects and advantages will become more apparent hereinafter.

BRIEF DESCRIPTION OF THE DRAWINGS

In the accompanying drawings which form a part of this specification and wherein like numerals refer to like parts wherever they occur:

FIG. 1A is an exploded perspective view illustrating the structure of a typical child's car seat for environmental purposes, FIG. 1B is a perspective view showing the supporting frame structure of another typical child's car seat, FIG. 1C is a perspective view showing the supporting frame structure of yet another child's car seat.

FIG. 2 is an exploded perspective view of one embodiment of a stroller apparatus embodying the present invention, FIG. 3 is a greatly enlarged view taken substantially along line 3—3 of FIG. 2, and showing one latching mechanism feature of the invention, FIG. 7 is a side elevational view showing a child's car seat assembled on a stroller apparatus of the present invention, FIG. 8 is a greatly enlarged cross-sectional view taken substantially along line 8—8 of FIG. 7, FIG. 9 is an enlarged fragmentary side elevational view showing another embodiment of a stroller apparatus.

BRIEF DESCRIPTION OF THE PREFERRED EMBODIMENTS

Figure 4:
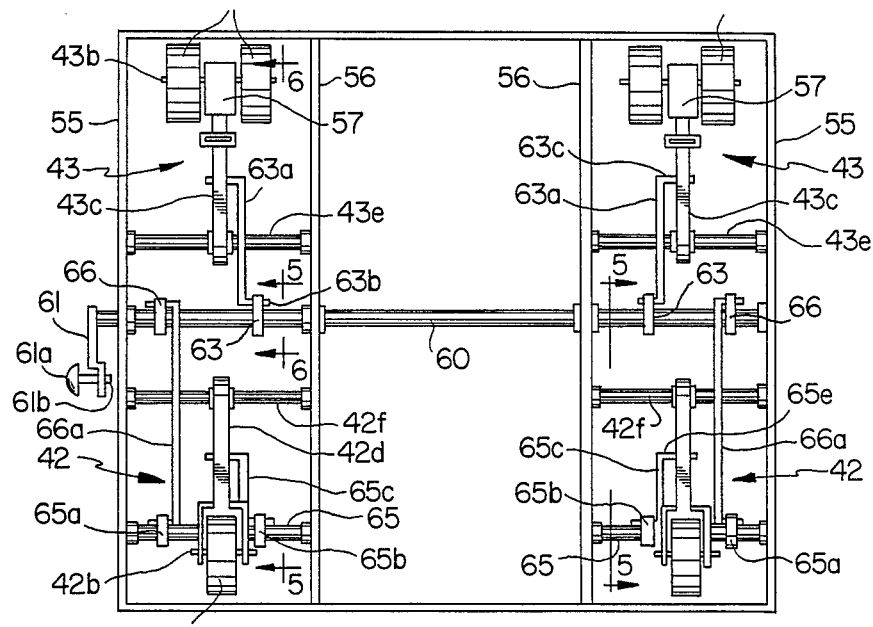
FIG. 4 is a bottom plan view of the assembled operating mechanism for the stroller apparatus embodiment of FIG. 2.

Referring to FIG. 1A, a typical juvenile car seat 10A is illustrated to show one form of structure to which the stroller apparatus of the present invention is applicable. As shown, typical child's car seats today have a molded plastic seat shell 12A, and a tubular supporting frame 14A. The seat shell 12A includes a back portion 15, a seat portion 16 and side wings 17 forming into arm rests 18 to generally confine the shoulders, torso and legs of the juvenile against lateral movement. Typically, the interior back and seating portions 15,16 are lined with a comfortable cloth padding (not shown) and torso seat belt restrainers (not shown) are provided. Most current car seat models are also provided with padded trays (not shown) that fold down in front of the juvenile during use.

The tubular supporting frame 14A includes an angularly disposed rectangular tubular frame member 19 having diagonal side portions 20 interconnected by horizontal top and bottom members 21 and 22. L-shaped tubular frame members 23 each include a vertical back portion 24 connected at the top 24a to the top member 21 (or the side piece 20 adjacent thereto), and a horizontal lower portion 25 having its forward end 25a connected to the bottom member 22 (or the side piece 20 adjacent thereto). A strengthening bar or tube 23a interconnects between the vertical back portion 24 of the L-shaped members 23. This tubular supporting frame 14A is rigidly secured to the seat shell 12A in a suitable manner to form a rigid car seat unit (10A), and this unit is strapped onto the seat of a vehicle by the usual well-known procedure of buckling a conventional vehicle seat belt (not shown) across the L-shaped frame members 23 at the juncture of the vertical and horizontal pieces 24,25.

The car seat 12A further includes, as a part of the supporting frame 14A, a rectangular tubular supporting base 26 having side members 27 and front and rear members 28 and 29. The lower or bottom supporting base 26 carries the upper supporting frame members 19,23 on front and rear links 30 to provide a relative pivoting action (shown by the arrows in FIG. 1A), by which the car seat unit 10A can be moved on the lower supporting base 26 between an upright position (as illustrated) and an angular tilted or reclining position, as is well-known in this art.

Referring to FIG. 1B, in an alternate form of child's car seat, the tubular supporting frame structure 14B includes an angularly disposed U-shaped frame member 19B having side portions 20B interconnected by a bottom or lower member 22B, and L-shaped frame members 23B have vertical back portions 24B interconnected by a top member 21B to which the upper ends of the side pieces 20B are secured. As with the embodiment in FIG. 1A, the forward ends of the horizontal pieces 25B are secured to the frame member 19B, and another frame piece 23b rigidifies the vertical back pieces 24B. In the FIG. 1B embodiment, a U-shaped supporting base 26B has side members 27B and a front member 28B, and the rear portions 29B of the side pieces 27B turn vertically upwardly and are disposed below the L-shaped frame members 23. Links 30B connect the U-shaped supporting base 26B to the upper supporting frame members 20B and 23B for pivotal movement between an upright position and a reclining position.

Referring to FIG. 1C, in another form of juvenile car seat, a rigid supporting frame 14C includes a rectangular, angularly disposed frame member 19C having diagonal side portions 20C interconnected by top and bottom portions 21C and 22C, and a strengthening rod 23c is provided. A U-shaped frame member 31 has side portions 32 interconnected by a bottom portion 33, and the top ends 31c of the side walls 31 are rigidly secured to the side pieces 20C of the frame member 19C at an intermediate location and at a divergent angle thereto. The bottom portions 22C and 33 are further rigidified by spaced structural rods 34 to maintain a fixed, non-movable relationship between the frame members 19C and 31. In this structural embodiment the bottom frame pieces 22C and 31 form the supporting base (26C) for the car seat unit.

The car seat structure 14A, 14B and 14C thus far described is shown for environmental purposes to illustrate some of the different car seat frames that are presently in use, and which can be converted to mobile stroller units when used in combination with the apparatus of the present invention, as will now be described.

Referring to FIG. 2 showing one embodiment of the present invention, a stroller apparatus 40 includes a base frame 41 having rear wheel units 42 and front wheel units 43 and a mechanism 44 for actuating rear and front wheel sets (42,43) between an extended, operative stroller position and a retracted, inoperative car seat position in which the wheel sets are recessed within the base frame 41, as will be described. The base frame 41 is preferably encased within a molded plastic shell housing 45 having one means for releasably interlocking a conventional car seat thereto although, in an alternative form described hereinafter, latching means may be provided on the base frame (40) for direct attachment to a car seat frame. The moded shell housing 45 of FIG. 2 includes an upper car seat receiving and retaining section 46 and a lower stroller mechanism section 47 with a common horizontal wall 48 having an upper supface 48a defining the bottom wall of the upper section 46 and having a lower surface 48b defining the top wall of the lower section 47. The upper section 46 is formed by opposed side walls 46b and front and rear walls 46b and 46c, which with the upper surface 48a of the common wall 48 define an upper recessed cavity in which the supporting base frame (26) of a car seat (10A) is positioned.

It will be understood that a manufacturer of juvenile furniture will typically make a line of children's car seats in different seating configurations or styles, and in different colors or padded fabric selections to offer a variety of choices to the retail purchaser. Usually the supporting tubular framework (14A of FIG. 1) will be the same for the entire car seat line. Therefore, if the same manufacturer also produces the stroller apparatus (40) of the present invention, the upper section 46 of the shell housing 45 can be designed specifically to receive and interlock with the car seat base frame (26) common to the manufacturer's car seat line. Using the car seat configuration of FIG. 1 as an example, and assuming that the same manufacturer also makes the stroller apparatus, the inner wall surfaces 49 of the upper recessed cavity are configured to closely confine the supporting base 26 against lateral movement. As shown in broken lines in FIG. 2, the front and rear tubular member 28 and 29 abut a recessed vertical wall section 49a and the side members 27 of this supporting base 26 are retained by end abutment shoulders 49b of these wall sections. As also shown, the inner surfaces 49 of the opposed side walls 46a are molded with sloping shoulders 49c, which seat the L-shaped frame pieces 24,25 when the car seat 10A is rocked forwardly to its reclining position as will be understood.

The upper housing section 46 is provided with latching means 50 for engagement with the tubular supporting base 26 so as to releasably interlock the car seat 10A on the stroller unit 40. The opposed front and back walls 49 of the upper section 46 are molded with enlarged exterior columns 50a, which are notched and keyed to receive the latching mechanism 50 shown best in FIG. 3. The latch device has a latch element 51 pivotal on a pin 51a for movement between a horizontal latching position or closed condition in which a hooked recess 51b can operatively engage a tubular base member (28,29) and a vertical retracted position or open condition (shown in broken lines in FIG. 3) in which the element 51 permits unrestricted seating access of the car seat frame 14A into a recessed cavity. The base portion of the latch element 51 is provided with an arcuate slotted cam follower or track 51c, which intersects the location of hinge pin 51a and in which the roller cam 52a of a locking lever 52 is operatively positioned. The lever 52 is pivotally mounted on pin 52b and has a lever handle 52c for operating the latch element 52. It will be clear that the lever handle 52 is normally positioned in a recessed area of the exterior wall section 49 when the latch element 51 is horizontally disposed in latching engagement with a base frame piece (27,28). By raising the handle 52c, the roller cam 52a is moved along the cam track 51c to pivot the latch element 51 upwardly to its vertical position whereby the car seat 10A can be positioned in or removed from the recessed cavity of the upper section 46.

It will be understood that the latching means 50 can be constructed and arranged as needed to securely engage the supporting base 26, 26B, 26C or the like of a car seat. Therefore, in the embodiment shown in FIG. 2 in which the upper shell housing section 46 is designed to receive the supporting base (26, 26C) of a specific car seat line, secure interlocking can be achieved by providing spaced latch mechanisms 50 on opposed sides 49 of the upper section. In other embodiments, it may be desired to have single interlocking latch means (50) engaged with each supporting base piece, as will appear.

Referring again to FIG. 2, the lower section 47 of the shell housing 45 has opposed, laterally spaced, parallel side walls 53 interconnected by opposed parallel front and rear walls 54, which with the lower surface 48b of the common wall 48 define a lower recessed cavity for containment of the base frame 41. It will be understood that the base frame 41 may have several variants to achieve strength and rigidity, ease of manufacture and be light weight. In the embodiment of FIG. 2, the base frame 41 includes opposed, laterally spaced, outer side frame members or plates 55 and a pair of inward frame members or plates 56. The outer frame members 55 are metal alloy, such as steel plates, and may be incorporated into the side walls 53 of the lower housing section 47 during molding, and the corner of this housing is broken away in FIG. 2 to show opposed top and bottom flanges 53a defining vertical slots 53b in which the outer frame members 55 are received and rigidly held as an integral part of the housing 45. An area of front wall 54 is also broken away to show this wall section provided with vertical slots 54a for receiving and locating the ends of frame members 56 in fixed paired spaced relation with the adjacent outer frame members 55 and with the housing 45. Thus, the entire base frame 41 and its wheel 42,43 and operating mechanism 44 may be made as a drop-in unit to be secured in the lower housing section 47, or the outer frame walls 55 may be molded into the housing during fabrication and the remainder of the mechanism, including wheel units 42 and 43, assembled later on the outer frame members 55 depending upon manufacturing preferences, weight and cost.

Figure 5:
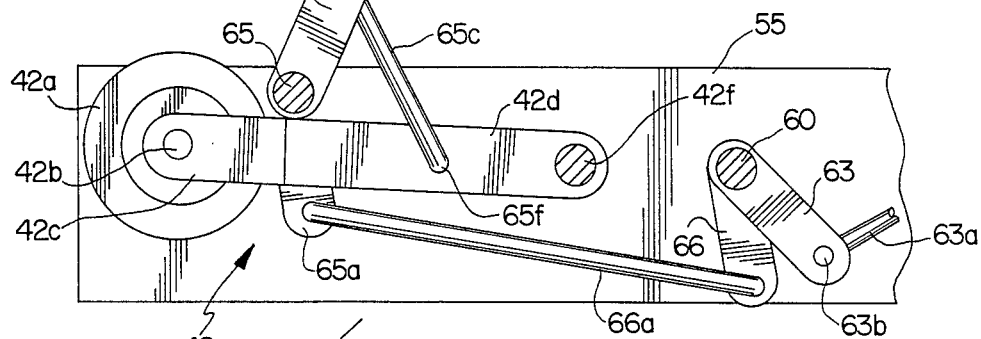
FIG. 5 is a greatly enlarged fragmentary view of the linkage mechanism for the rear wheel set, as taken along line 5—5 of FIG. 4.
Figure 6:
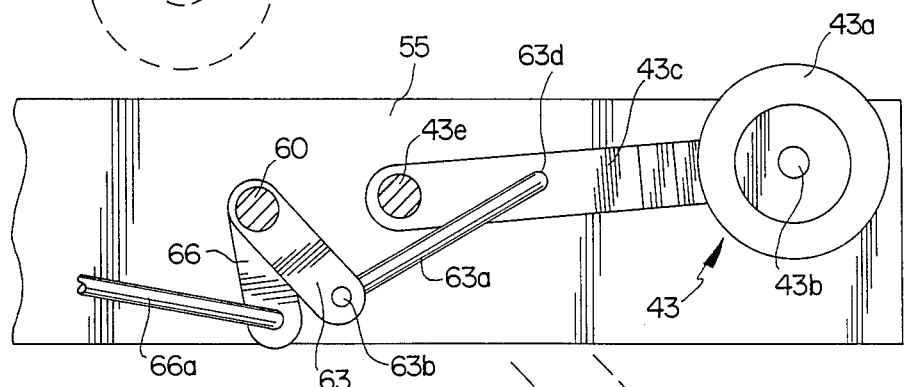
FIG. 6 is a greatly enlarged fragmentary view of the linkage mechanism for the front wheel set, as taken along line 6—6 of FIG. 4.

Still referred to FIG. 2 and to FIGS. 4–6, the rear wheel units 42 each comprise a wheel 42a mounted on axle pin 42b in a yoke 42c carried on the outer end of an elongated strut or leg 42d. The inner end of the leg 42d has an opening or bearing 42e mounted for rotation on a short rod 42f extending between the opposed surfaces of adjacent outer and inner frame members 55 and 56 on the rear side and proximate to the center point thereof between their ends. Similarly, the front wheel units 43 each comprise at least one wheel 43a rotatably mounted on an axle pin 43b preferably journaled on a swivel block 57 (FIG. 4) typical of modern strollers for front wheel manuverability. The swivel block 57 is carried on the outer end of an elongated strut or leg 43c, which has an opening or bearing 43d on its inner end that is rotatably mounted on a short rod 43e extending between the paired outer and inner frame members 55 and 56 on the front side and proximate to the center point thereof between their ends. It will be clear that the front and wheel units 42 and 43 are carried by the base frame 41 for vertical swinging or hinging movement between a lower operative stroller position extending below the base frame 41 and an upper inoperative car seat position retracted within the base frame.

The operating mechanism 44 of the stroller apparatus 40 includes a main drive rod 60 which is centrally disposed intermediate to the short rods 42f and 43e of the rear and front wheel units 42 and 43 and substantially equidistant between the ends of the frame members 55 and 56. The drive rod 60 is journaled for rotation in the frame members 55 and 56, and one end 60a projects outwardly through one side frame 55 and the corresponding side wall 53 of the lower housing section 47 through a slot 60b in a molded recess 60c provided in this side wall 53. The outer end 60a of the drive rod 60 has an operating lever 61 with a handle or knob 61a and spring-loaded locking pin 61b on its outer end. A locking plate 62 is secured in the molded recess 60c of the lower housing side wall 53, as by bolts or rivets (not shown) through complementary openings 62a, and the locking plate 62 has left-hand and right-hand locking openings or apertures 62b and 62c for selectively receiving the spring-loaded locking pin 61b therein. In the embodiment as illustrated, the left-hand opening 62b establishes a drive rod locking position for the rear and front wheel sets 42 and 43 in the retracted inoperative car seat position, and the right-hand opening 62c establishes a drive rod locking position for locking the wheel sets in their extended, operative stroller position. Thus, the handle knob 61a can be pulled axially outwardly away from the lower housing side wall 53 and locking plate 62 therein to release the pin 61b from its locking engagement in one locking aperture (62b) so that the lever 61 can be turned to a locking positon of the pin 61b with the other aperture (62c).

As shown best in FIG. 6, the main drive rod 60 has a direct linkage for actuating the front wheel sets 43 between a retracted car seat mode and an extended stroller mode. A drive link 63 for each front wheel unit 43 is radially recured to the drive rod 60 intermediate the outer and inner plates 55 and 56 and at a predetermined depending angle. A connection or drive rod 63a has one end 63b pivotally connected to the lower free outer end of the link 63, and the other end 63c of this drive rod 63a is pivotally connected to an opening 63d in the leg 43c of the front wheel unit 43. The front wheel units 43 are shown in their retracted car seat mode in FIGS. 2 and 4–6, and clockwise rotation of the main drive rod 60 by lever 61 will act on the connecting rods 63a to pull the legs 43a downwardly (and leftwardly) to cause the wheel legs 43c to rotate on their bearing engagement (43d) with the rods 43e to lower the wheel sets 43a to their lower extended stroller position shown in broken lines in FIG. 6.

As shown best in FIG. 5, the main drive rod 60 has an indirect or reversely-acting linkage for actuating the rear wheel sets 42 between their retracted car seat mode and an extended stroller mode. The rear wheel linkage includes an idler rod 65 journaled between each pair of outer and inner plates 55 and 56 in spaced relation to the main drive rod 60, adjacent to the rear wall margins of these plates. A main drive link 66 for each rear wheel unit 42 is secured to the main drive rod 60 intermediate to the outer and inner plates 55 and 56 and at a predetermined depending angle, and a similar link 65a is secured to the idler rod 65 at a predetermined depending angle and in transverse front-to-back alignment with the drive rod 66. The links 66 and 65a are interconnected by a drive rod 66a having its ends pivotally connected at the outer free ends of these links 66 and 65a. Thus, rotation of the main drive rod 60 by lever 61 effects a corresponding rotation in the same direction of the idler rod 65 through the linkage 66, 66a and 65a. Another link or idler arm 65b is secured to the idler rod 65 at a predetermined upstanding angle. Another connection or drive rod 65c has one end 65d pivotally connected to the upper free end of the idler arm 65b and its other end 65e is pivotally connected to an opening or bearing 65f in the leg 42d of the rear wheel unit 42. Thus, when the drive rod 60 and idler rod 65 are rotated in a clockwise direction through the drive linkage described, the idler arms 65b are rotated to push downwardly on the rear wheel legs 42d and actuate the rear wheel sets 42 to their extended stroller mode position as shown in broken liens in FIG. 5.

Referring again to FIG. 1 and to FIGS. 7 and 8, a feature of the invention is to provide a stroller handle 70 for movement between a retracted car seat mode and an extended stroller mode. The handle 70 comprises a pair of elongated lower tubular side frames or slide members 71 having lower ends 71a and upper ends 71b, and an upper U-shaped tubular frame 72 having side members 72a telescopically received in the side frames 71 and interconnected at the top by a cross handle member 72b. The U-shaped frame 72 is slidable in the side frames 72 to an extended stroller position, shown in broken lines in FIg. 7, and is releasably and adjustably locked in this position by a spring-loaded locking mechanism 73, to be described presently. In this embodiment, the side frames 71 are adapted to be mounted on the plastic shell (12A) of an existing car seat (10A). As shown in FIGS. 7 and 8, upper and lower side mounting brackets 74 and 75 each include a sleeve member 76 with an inside wall 76a to slidably receive the tubular side frame 71, and these sleeves 76 are angularly secured to mounting plates 77 having upper and lower sections 77a and 77b to be secured to the shell wings 17 and lower leg section 18a, as by self-tapping screws 77c. The bottom of the sleeves 76 of the lower mounting plates 75 are closed by end plugs or caps 75a to seat and hold the lower end of the side frames 71 in place.

The lower section of the U-frame side members 72a may be provided with a series of axially spaced openings 72c for height adjustment of the handle member 72b, and another opening 72d may be provided in the side member 72a adjacent to the handle member 72b to lock the handle 70 in its lower car seat mode. The locking mechanism 73 is similar to the locking mechanism 61a for the drive mechanism 44 and includes a handle knob 78 on the end of an elongated locking pin 78a which has an annular shoulder 78b slidable in bore 78a of a cup-shaped retainer 79 threadedly attached to the side wall of the tubular side frame 71 adjacent to the upper end 71b thereof. A spring 79b bears against the base of the cup retainer 79 and the annular shoulder 78b. Therefore, when the handle knob 78 is pulled outwardly, the locking pin 78a is withdrawn from engagement with one of the openings 72c (or a similar opening adjacent to the handle member 72b for also locking the U-frame 72 in its car seat mode), thereby freeing the U-frame members 72 for relative sliding movement in the side frames 71. It will be clear that once the mounting brackets 74 and 75 are secured to the car seat shell 12A, the entire handle and side frame members can be either assembled therein or selectively removed.

In general use of the preferred embodiment described, it will be apparent that the stroller apparatus 40 can be assembled with the car seat (10A) by operating the latching mechanism 50 to engage the supporting base 26 of the tubular frame 14A. With the wheel sets 42 and 43 retracted and the handle member 72 fully telescoped into the side frames 71, as described, the combined unit is adapted for use in its car seat mode. By removing this unit from the vehicle and operating the locking mechanism 61,62 to extend the wheel sets 42 and 43 and also extending the handle member 72, the unit is ready for use in its stroller mode.

Figure 10:
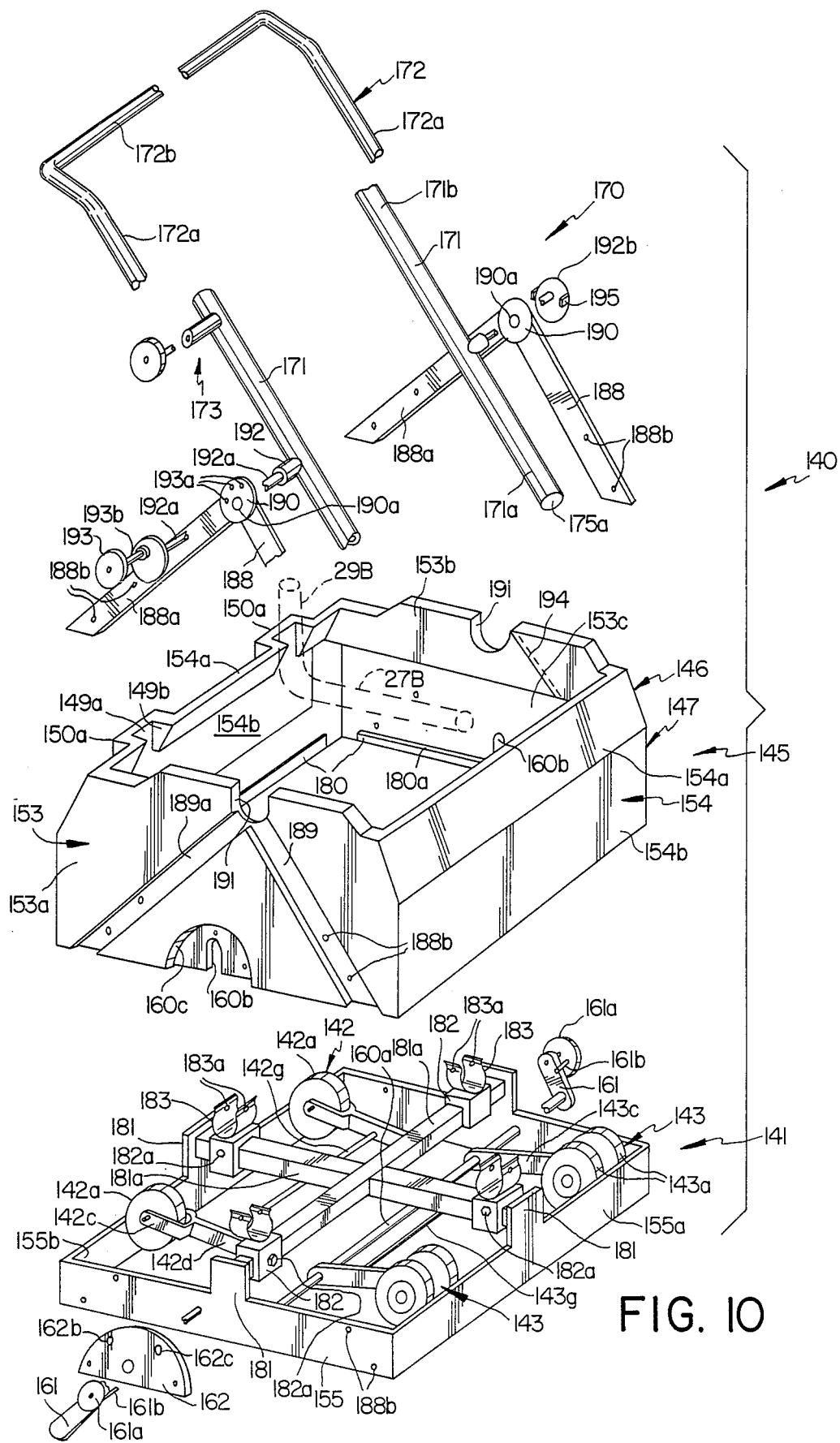
FIG. 10 is an exploded view of the stroller apparatus of FIG. 9.

Referring now to FIGS. 9-12, another embodiment of the stroller apparatus 140 includes a base frame 141, a molded plastic shell housing 145 and a stroller handle 170. The shell housing 145 in these Figures is basically the same with respect to the base frame 141 and handle 170, but the construction in FIG. 10 is slightly modified to show another adaptation for a specific car seat frame, as will be described hereinafter.

Figure 11:
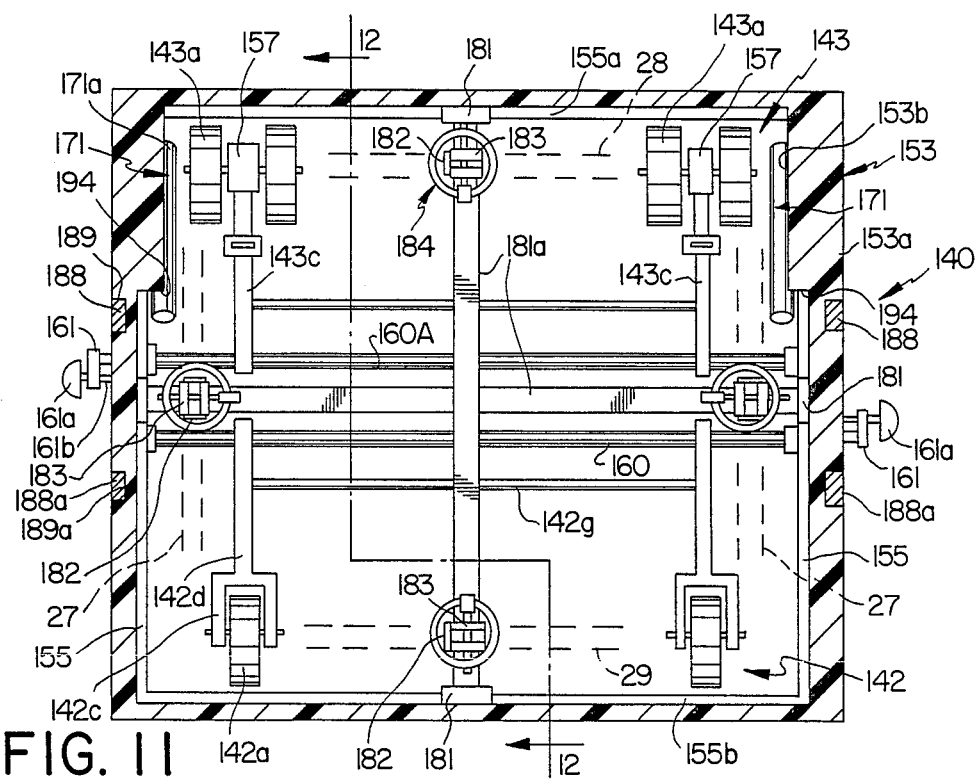
FIG. 11 is a sectional plan view of the stroller apparatus taken substantially along line 11—11 of FIG. 9.
Figure 12:
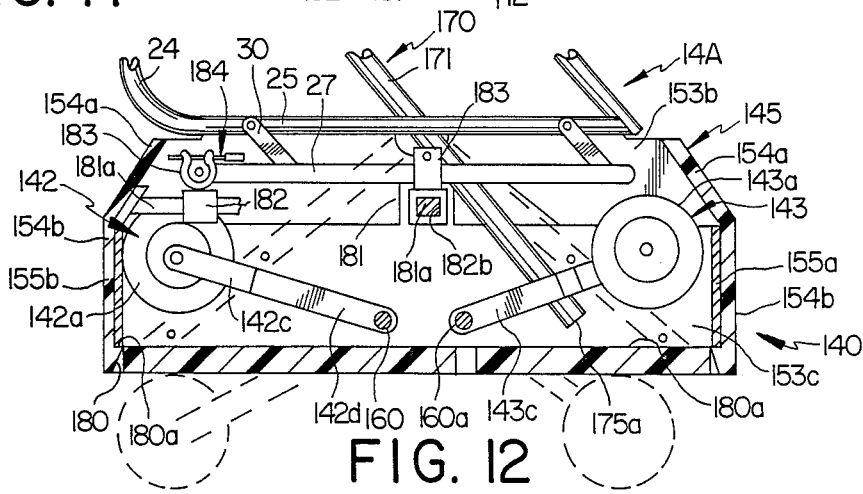
FIG. 12 is a cross-sectional view taken substantially along line 12—12 of FIG. 11.

The base frame 141 has rear wheel units 142 and front wheel units 143 and operating mechanism for actuating each of the rear wheel sets and front wheel sets between an extended stroller mode (FIG. 9) and a retracted car seat mode (FIGS. 10-12). The base frame 141 includes outer side frame members 155 interconnected by front and rear frame members 155a and 155b to form a box-frame unit. The rear wheel units 142 are similar to the FIG. 2 embodiment and each comprises a wheel 142a rotatably mounted in a yoke 142c carried on the outer end of a strut or leg 142d. The inner end of the leg 142d is secured to a cross rod or drive shaft 160 journaled for rotation on the side frame members 155. The struts 142d are cross-braced as by a bracing rod 142g so that the rear wheel units 142 will pivot together as a set upon rotation of the rear wheel drive rod 160, as will appear. The front wheel units 143 are also similar to the FIG. 2 embodiment and each preferably includes a pair of front wheels 143a journaled on a swivel block 157 pivotally mounted on the outer end of an elongated strut or leg 143c to provide turning movement of the front wheel units 143 for manuverability. The inner end of the leg 143c is secured to a cross rod or drive shaft 160A journaled in the side frame members 155 for rotation. The front wheel struts 143c are also cross-braced by a bracing rod 143g to be pivoted together as a set upon rotation of the front wheel drive rod 160A.

It will be understood that, in this embodiment, the rear wheel set (142) is independently operated by drive shaft 160, and the front wheel set (143) is independently operated by drive shaft 160A. To that end, the drive shafts 160 and 160A project outwardly through the opposite side frame members 155 and the shell housing 145, and the outer end of each shaft 160, 160A has an operating lever 161 with a handle or knob 161a and spring-loaded locking pin 161b on its outer end. As in the FIG. 2 embodiment, each lever 161 and locking pin 161b cooperates with a locking plate 162 secured in an exterior molded recess 160c formed in the lower portion of side wall 153 of the shell housing 145. The locking plates 162 have left-hand and right-hand lock openings or apertures 162b and 162c for selectively receiving the locking pin 161b to secure the respective rear wheel set 142 and front wheel set 143 either in their retracted, inoperative car seat mode or their extended operative stroller mode. As will be clear from FIGS. 9 and 10, the rear wheel set is actuated from its retracted or recessed car seat position to its extended stroller position by pulling the handle knob 161a axially lock opening 162c and turning the operating lever 161 to rotate the drive shaft 160 counterclockwise for engagement of the locking pin in the left-hand lock opening 162b. The front wheel set is similarly operated from the opposite side of the stroller apparatus 140.

The stroller apparatus 140 is designed to accommodate child's car seats made by different manufacturers and having tubular supporting base frames (26, 26B, 26C) of different sizes and direction of orientation. Thus, the shell housing 145 is formed of unified upper and lower sections 146 and 147 having peripheral walls defining an open center area for direct access to the base frame 141, and the base frame 141 includes adjustable means for interlocking with the supporting bases (26) of different car seats (10A, 10B, 10C). More specifically, the shell housing 145 is rectangular, and the opposed side walls 153 of the upper and lower sections 146 and 147 are vertical and have a planar outer surface 153a. The upper sections of the side walls 153 are thicker than the lower sections and have inner surfaces 153b, and the thinner lower wall sections have inner surfaces 153c recessed outwardly from the upper section surfaces 153b. The housing 145 also has front wall 154 with inwardly sloping upper section portions 154a and lower section portions 154b. As shown best in FIGS. 9 and 10, the recesses 160c for the locking plates 162 are molded into the outer side wall surfaces 153a of the housing 145, and slots 160b are formed to receive the drive shafts 160, 160A when the base frame 141 is assembled in the shell housing 145.

The base frame assembly 141 fits within the lower section 154 of the housing 145 with the frame members 155, 155a and 155b being in surface contact with the inner wall surfaces of the lower section 154. The plastic shell housing 145 has some resiliency, and the lower margins of the inner wall surfaces are provided with projecting ribs 180 with upper abutment ledges or shoulders 180a, which may be peripherally spaced apart sections (as shown at the inner housing carrier of FIG. 10). Thus, the lower section walls 153c and 154b will flex outwardly slightly as the base frame 141 is assembled and then regains its molded shape to seat the lower margins of the frame members 155, 155a, 155b on the abutment shoulders 180a. The base frame assembly 141 and shell housing 145 are further held together in assembled condition when the handle assembly 170 is secured thereto, as will be described.

In the embodiment of FIGS. 9-12, the latching mechanism for releasably securing a child's car seat (10A) to the stroller apparatus 140 is contained on the base frame assembly 141. The frame members 155, 155a and 155b are provided with upstanding lugs or ears 181, and slide bars or rods 181a traverse or span the space between opposed lugs 181 in a cruciform pattern. each of the four slide bar sections is provided with a slidable orientation block 182 having a set screw 182a or other means for transversely adjusting the position of the slide blocks 182 on the slide bars 181a. The slide bars 181a and slide block openings 182b are preferably of square cross-section or otherwise have a flattened mating key area to prevent relative rotation. The upper surface of each slide block 182 has an upwardly opening, U-shaped spring clip 183 having an open condition in which the tubular base frame members (26) of the car seat (10A) can be received and releasably held.

Figure 13:
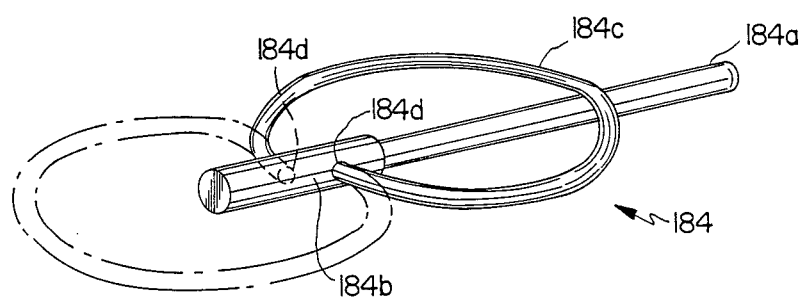
FIG. 13 is a greatly enlarged perspective view of a retainer clip used in the embodiment of FIGS. 9-12.

A retainer pin 184 may be provided to lock the base frame member (26) in a closed condition on the U-clip 183, and a preferred retainer pin 184 is shown best in FIG. 13. The retainer pin 184 includes an elongated pin member 184a to be received through openings 183a in opposed clip walls adjacent to the top access opening thereto. An enlarged base 184b is provided on one end of the pin 184a, and a locking ring member 184c has its ends 184d pivotally seated into opposite sides of the base 184b in an offset spaced relation so that the ring will snap from a remote position (shown in phantom lines) to a locking position in which the ring member 184c engages the pin 184a and substantially encircles the upper free end margins of the U-clip 183.

Using the child's car seat 10A (FIG. 1A) as an example, the car seat is interlocked with the stroller apparatus 140 by first removing the retainer pins 184 from the spring clips 183. It will be understood that the slide blocks 182 are initially unset or free to move on the slide bars 181 in order to adapt the stroller apparatus to the specific car seat frame. The rectangular supporting base frame 26 of the car seat 10A is then centered in the central open area of the molded housing 145, and the slide blocks 182 are moved to position the spring clips 183 in registration with the respective base frame members 27, 28 and 29 which are then pressed into the clips to secure the car seat 10A and stroller apparatus 140 together. The retainer pins 184 are again inserted into the clip openings 183a to securely interlock the base frame 26 in its assembled position, and the set screws 182a of the slide blocks 182 are set on the slide bars 181a. Once set in this position, the slide blocks 182 should not require further adjustment and the car seat 10A can be removed from the stroller apparatus, if desired, or reassembled thereon at will by using the retainer pins 184.

The shell housing 145 will accommodate the base frames (26) of different tubular car seat frames by re-orienting the slide blocks 182 following the foregoing procedure, and the interlocking of the car seat base frames at even two or three points will provide a secure connection with the stroller apparatus 140. The form of the shell housing 145 in FIG. 10 illustrates a modification to better accommodate the car seat frame 14B of FIG. 1B. In that car seat frame, the base 26B has longer side frame members 27B, and the rear wall 154a of the upper housing section 146 may be molded with spaced vertical columns 150a having interior recessed wall sections 149a forming side wall abutment shoulders 149b to receive the upturned tubular frame member 29B. However, the basic interlocking connection between the base frame members 27B and 28B and the stroller apparatus 140 is still provided by the adjustable position slide block 182 and spring clip 183 arrangement previously described.

Still referring to FIGS. 9-12, the handle 170 for the stroller apparatus 140 of this embodiment also includes a pair of elongated tubular side members 171 having lower ends 171a with end caps or plugs 175a and open upper ends 171b. A U-shaped tubular frame 172 has side members 172a telescopically received in the side frames 171 and being interconnected at the top by a cross handle member 172b. The U-shaped frame 172 is slidable in the slide frame members 171 between telescoped car seat and extended stroller mode positions, and is releasably and adjustably locked in its extended position by a locking mechanism 173 similar to that previously described. The handle 170 is strut-mounted and includes angularly related braces or mounting straps 188 and 188a connected at their top intersection by a strut plate 190. The braces or struts 188 and 188a are positioned in recessed slots 189 and 189a angularly formed in the outer side wall surfaces 153a of the shell housing 145 to converge upwardly from the lower margins adjacent to the front and rear walls 154b toward a central recess 191 formed in the side wall upper margin. The struts 188 and 189 are secured in these angular recesses 189 and 189a and to the base frame side members 155 by suitable fastening means, such as bolts or rivets (not shown) received through aligned openings 188b in the struts, housing recesses and frame side members. Thus, such fastening means secures together the handle struts and the base frame 141 in assembled condition with the housing 145.

In this embodiment the handle mechanism 170 is angularly adjustable relative to the stroller frame 141 and housing 145. The plates 190 of the side struts are aligned with the central recesses 191 of the upper side walls 153a and have central openings 190a. The tubular side frame 171 of the handle have hubs 192 projecting outwardly and being rotatably journaled in the recesses 191, which may form bearing surfaces therefor. A short axle rod 192a projects from each hub 192 and is carried in the opening 190a of plate 190, and the outer end of the axle rod 192a has a bearing plate 192b which frictionally bears against the strut plate 190 adjacent thereto. As shown in FIG. 10, the strut plate 190 on one side has a series of spaced openings 193a in which a spring-loaded locking pin 193b carried on handle 193 can be selectively positioned. This spring-loaded locking mechanism 193a, 193b is similar to the lock pin 161, 161a of the wheel actuation mechanism previously described. The strut plate 19 on the other side is maintained in firm frictional engagement with the bearing plate 192b by suitable gripping means, such as clips 195 so that angled adjustment of the handle 170 is provided by operating the locking mechanism 193 only on the one side. It will also be noted that the side frame members 171 are located on the interior side of the struts 188, 188a and positioned inside the housing side walls 153 and base frame side walls 155. The thicker upper housing side wall 153b extending forwardly from the recess 191 is undercut at a predetermined downward angle to form a shoulder 194 to provide a "fail-safe" limit to the rotation of the handle side members 171.

In operation, the handle mechanism 170 is assembled with its strut mounting 188, 188a secured to the housing and base frame side walls 153 and 155, and the tubular side members 171 extending downwardly on the inside of the base frame 141. The relative angularity of the side members 171 and U-frame side pieces 172a is determined by the locking position of the pin 193b in one of the bearing plate openings 193a, as shown by phantom lines in FIG. 9. Thus, the handle 170 is adjustable both in an extended length dimension and an angular position by the locking mechanism 173 and 193.

From the foregoing it will be seen that a novel stroller apparatus has been disclosed for converting a child's car seat to a mobile unit, and which is adaptable to a variety of such car seat constructions. Inasmuch as a number of changes and modifications can be made to the structures illustrated for disclosure purposes, as will be readily apparent to those skilled in the art, the invention is only to be limited by the scope of the appended claims hereto.

What is claimed is:

1. In combination with a juvenile car seat having a supporting base adaped to be positioned on a vehicle seat; a stroller apparatus for converting such car seat into a mobile stroller unit, comprising a base frame encased in a rigid shell housing, mechanical latching means for releasably interlocking the supporting base of said car seat to said base frame of said stroller apparatus, a set of front wheels mounted on said base frame for conjoint movement between an extended stroller position and a retracted car seat position in which said front wheels are recessed within said shell housing, a separate set of rear wheels mounted on said base frame for conjoint movement between an extended stroller position and a retracted car seat position recessed within the shell housing, lever means constructed and arranged for selectively actuating said front and rear wheel sets between said extended and retracted positions, and extensible handle means for said apparatus comprising a pair of elongated lower slide members, an upper handle frame having side members positioned for sliding movement relative to said slide members between an extended operative stroller position and an inoperative car seat position, said side members being interconnected by an upper cross handle member, locking means for releasably locking said slide and side members in said extended stroller position, and mounting means for securing said lower slide members relative to said stroller apparatus base frame, said mounting means comprising angularly related side struts secured to opposite sides of said base frame and being connected by strut plates, said slide members being connected to said strut plates and extending angularly downwardly adjacent to the opposite sides of said base frame.

2. The stroller apparatus according to claim 1, in which said base frame includes laterally spaced outer side frame members, and each of said sets of front and rear wheels including laterally spaced apart pairs of elongated leg members disposed substantially parallel to said side frame members, said pairs of front and rear leg members having adjacent inner ends connected for turning movement relative to said base frame and remote outer ends having said front and rear wheels rotatably mounted thereon.

3. The stroller apparatus according to claim 2, in which said lever means includes laterally extending drive rod means journaled in said side frame members between said sets of front and rear wheels and being operatively connected to said front and rear leg members, and a manual lever operatively connected to turn said drive rod means whereby selective operation of said lever effects rotation of said drive rod means to actuate said sets of front and rear wheels between said stroller and car seat positions.

4. The stroller apparatus according to claim 3, in which said lever means further includes locking means for locking said lever means and said drive rod means and wheel sets in the selected stroller and car seat position.

5. The stroller apparatus according to claim 3, in which said drive rod means comprise adjacent parallel front and rear drive shafts to which the respective inner ends of said front and rear leg members are secured, said front and rear drive shafts extending laterally outwardly in opposite directions from said side frame members, and separate manual levers on the outer ends of said front and rear drive shafts for independently operating said sets of front and rear wheels between said positions.

6. The stroller apparatus according to claim 3, in which said base frame includes a pair of inward side frame members positioned inwardly of said outer side frame members and extending in substantially parallel spaced relation therewith, said drive rod means comprising a main drive shaft laterally spanning said inward and outer side members and having one end projecting outwardly of one outer side frame member, said manual lever being secured to said one end for selective rotation of said main drive shaft in opposite directions, and means for linking said main drive shaft to said sets of front and rear wheels for conjoint movement between said positions upon rotation of said main drive shaft.

7. The stroller apparatus according to claim 6, in which a pair of axially aligned front short rods are provided between opposed pairs of inward and outer frame members in front of said main drive shaft and the inner ends of said front leg members are secured to said front short rods, and said linking means comprises front drive links radially secured to said main drive shaft at a predetermined angular position and connection rods interconnecting the front leg members with said front drive links to provice rotation of said front short rods in the same direction as said main drive shaft.

8. The stroller apparatus according to claim 6, in which a pair of axially aligned rear short rods are provided between opposite pairs of inward and outer frame members rearwardly of said main drive shaft and the inner ends of said rear leg members are secured to said rear short rods, said linking means comprising an axially aligned pair of idler rods journaled between said opposed pairs of inward and outer frame members in rearward spaced relation with said rear short rods, first connection rod means between said main drive shaft and said idler rods for conjoint rotation in the same direction, and second connection rod means between said idler rods and said rear leg members to provide rotation of said rear short rods in the opposite direction as said main drive shaft.

9. The stroller apparatus according to claim 1, in which said slide members are disposed on the inner side of said base frame and are hub-mounted intermediate their ends on said strut plates for relative rotation, and rotatable locking means engageable with one strut plate for selectively adjusting the angularity of said handle means relative to said base frame.

10. The stroller apparatus according to claim 9, in which said shell housing encasing said base frame has opposed side wall members with angularly upwardly converging recesses in the outer surfaces thereof, said side struts being disposed in said converging recesses and being secured through said side wall members to said base frame, said side wall members having enlarged upper wall portions projecting inwardly past said base frame, and said enlarged upper portions being undercut at a predetermined angle to form abutment shoulders overlying at least a portion of said slide members below said hub-mounted point of rotation.

11. In combination with a juvenile car seat having a supporting base formed of tubular members and adapted to be positioned on a vehicle seat; a stroller apparatus for converting such car seat into a mobile stroller unit, comprising a base frame encased in a rigid shell housing defined by front, rear and opposed side wall members and having an upper car seat receiving section and a lower base frame receiving portion, said base frame including laterally spaced outer side frame members and front and rear frame members interconnecting said side frame members, said base frame members being confined and secured within said front, rear and opposed side wall members of the lower portion of said shell housing to form an integral unit and said front, rear and side wall members also defining an open central area for direct access through the upper car seat portion thereof to said base frame, a set of front wheels mounted on said base frame for conjoint movement between an extended stroller position and a retracted car seat position in which said front wheels are recessed within said shell housing, a separate set of rear wheels mounted on said base frame for conjoint movement between an extended stroller position and a retracted car seat position recessed within the shell housing, each of said sets of front and rear wheels including laterally spaced apart pairs of elongated leg members disposed substantially parallel to said side frame members, said pairs of front and rear leg members having adjacent inner ends connected for turning movement relative to said base frame and remote outer ends having said front and rear wheels rotatably mounted thereon, lever means constructed and arranged for selectively actuating said leg members to move said wheel sets between said extended and retracted positions, extensible handle means on said stroller apparatus and being constructed and arranged for movement between an extended operative stroller position and an inoperative car seat position, releasable locking means for locking said handle means in at least one of said positions, and releasable latching means carried on said base frame and comprising a plurality of movable latch elements for engaging the tubular members of said supporting base to interlock said supporting base directly to said base frame, said base frame having slide bars traversing said frame members and orientation blocks adjustably secured on said slide bars, said latch elements being carried on said orientation blocks to an adjusted position aligned with the tubular members of the car seat supporting frame, and said latch elements having an open condition for receiving said tubular members and a closed condition for the releasable locking thereof.

12. The stroller apparatus according to claim 11, in which said latch elements comprises spring clips having open upper ends to receive the tubular members, and removable locking pin for engagement across said open ends to form said closed condition thereof.

13. The stroller apparatus according to claim 11, in which said lever means includes laterally extending drive rod means journaled in said side frame members between said sets of front and rear wheels and being operatively connected to said front and rear leg members, and a manual lever operatively connected to turn said drive rod means whereby selective operation of said lever effects rotation of said drive rod means to actuate said sets of front and rear wheels between said stroller and car seat positions.

14. The stroller apparatus according to claim 13, in which said lever means further includes locking means for locking said lever and said drive rod means and wheel sets in the selected stroller and car seat position.

15. The stroller apparatus according to claim 13, in which said drive rod means comprise adjacent parallel front and rear drive shafts to which the respective inner ends of said front and rear leg members are secured, said front and rear drive shafts extending laterally outwardly in opposite directions from said side frame members, and separate manual levers on the outer ends of said front and rear drive shafts for independently operating said sets of front and rear wheels between said positions.

16. The stroller apparatus according to claim 13, in which said base frame includes a pair of inward side frame members positioned inwardly of said outer side frame members and extending in substantially parallel spaced relation therewith, said drive rod means comprising a main drive shaft laterally spanning said inward and outer side members and having one end projecting outwardly of one outer side frame member, said manual lever being secured to said one end for selective rotation of said main drive shaft in opposite directions, and means for linking said main drive shaft to said sets of front and rear wheels for conjoint movement between said positions upon rotation of said main drive shaft.

17. The stroller apparatus according to claim 16, in which a pair of axially aligned front short rods are provided between opposed pairs of inward and outer frame members in front of said main drive shaft and the inner ends of said front leg members are secured to said front short rods, and said linking means comprises front drive links radially secured to said main drive shaft at a predetermined angular position and connection rods interconnecting the front leg members with said front drive links to provide rotation of said front short rods in the same direction as said main drive shaft.

18. The stroller apparatus according to claim 16, in which a pair of axially aligned rear short rods are provided between opposite pairs of inward and outer frame members rearwardly of said main drive shaft and the inner ends of said rear leg members are secured to said rear short rods, said linking means comprising an axially aligned pair of idler rods journaled between said opposed pairs of inward and outer frame members in rearward spaced relation with said rear short rods, first connection rod means between said main drive shaft and said idler rods for conjoint rotation in the same direction, and second connection rod means between said idler rods and said rear leg members to provide rotation of said rear short rods in the opposite direction as said main drive shaft.

* * * * *